(12) United States Patent
Xing et al.

(10) Patent No.: US 11,876,618 B2
(45) Date of Patent: Jan. 16, 2024

(54) DYNAMIC NUMEROLOGY BASED ON SERVICES

(71) Applicant: T-Mobile USA, Inc., Bellevue, WA (US)

(72) Inventors: Shuqing Xing, Bellevue, WA (US); Scott Francis Migaldi, Cary, IL (US); John Humbert, Roeland Park, KS (US); Brian Allan Olsen, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/078,544

(22) Filed: Dec. 9, 2022

(65) Prior Publication Data

US 2023/0104370 A1 Apr. 6, 2023

Related U.S. Application Data

(63) Continuation of application No. 17/111,226, filed on Dec. 3, 2020, now Pat. No. 11,552,725, which is a
(Continued)

(51) Int. Cl.
*H04L 1/00* (2006.01)
*H04J 11/00* (2006.01)
(Continued)

(52) U.S. Cl.
CPC ........ *H04L 1/0003* (2013.01); *H04J 11/0023* (2013.01); *H04W 28/0268* (2013.01); *H04J 2011/0096* (2013.01); *H04W 4/70* (2018.02)

(58) Field of Classification Search
CPC .. H04L 1/0002; H04L 1/0003; H04J 11/0023; H04J 2011/0096; H04W 28/02; H04W 28/0268; H04W 4/70
See application file for complete search history.

(56) References Cited

U.S. PATENT DOCUMENTS

| 9,860,099 B1 | 1/2018 | Noh et al. |
| 10,547,480 B2 * | 1/2020 | Zhang ................. H04L 27/2646 |

(Continued)

FOREIGN PATENT DOCUMENTS

| EP | 3277046 | 1/2018 |
| WO | WO2017039283 | 3/2017 |

(Continued)

OTHER PUBLICATIONS

European Office Action dated Feb. 3, 2023, for European Patent Application No. 19747735.9, a counterpart foreign application of U.S. Pat. No. 10,862,613, 7 pages.

(Continued)

*Primary Examiner* — Jenee Holland
(74) *Attorney, Agent, or Firm* — Lee & Hayes, P.C.

(57) ABSTRACT

A base station can select orthogonal frequency-division multiplexing (OFDM) numerologies that define subcarrier spacing values based on attributes associated with one or more services that a user equipment (UE) is using. The base station can use the selected OFDM numerologies for transmission associated with the services. When the UE is using multiple services simultaneously, the base station can select the same or different OFDM numerologies for the multiple services.

20 Claims, 7 Drawing Sheets

Related U.S. Application Data continuation of application No. 16/004,240, filed on Jun. 8, 2018, now Pat. No. 10,862,613.

(60) Provisional application No. 62/646,281, filed on Mar. 21, 2018, provisional application No. 62/625,164, filed on Feb. 1, 2018.

(51) Int. Cl.
*H04W 28/02* (2009.01)
*H04W 4/70* (2018.01)
*H04L 5/00* (2006.01)
*H04L 27/26* (2006.01)

(56) References Cited

U.S. PATENT DOCUMENTS

| | | | |
|---|---|---|---|
| 11,395,251 B2 | 7/2022 | Viorel et al. | |
| 11,432,263 B2* | 8/2022 | Lee | H04W 4/40 |
| 2009/0138616 A1 | 5/2009 | Alvarez et al. | |
| 2009/0196233 A1 | 8/2009 | Zhu et al. | |
| 2010/0067489 A1 | 3/2010 | Pelletier | |
| 2010/0158009 A1 | 6/2010 | Lee et al. | |
| 2011/0136526 A1 | 6/2011 | Park et al. | |
| 2013/0322285 A1 | 12/2013 | Fidler | |
| 2014/0050170 A1 | 2/2014 | Xu et al. | |
| 2015/0079994 A1* | 3/2015 | Ji | H04W 24/02 455/436 |
| 2015/0120914 A1 | 4/2015 | Wada et al. | |
| 2015/0341834 A1* | 11/2015 | Lee | H04W 24/08 370/332 |
| 2016/0241376 A1 | 8/2016 | Gauvreau et al. | |
| 2016/0294498 A1 | 10/2016 | Ma et al. | |
| 2016/0337212 A1 | 11/2016 | Shanks et al. | |
| 2017/0064711 A1 | 3/2017 | Choi et al. | |
| 2017/0118054 A1 | 4/2017 | Ma et al. | |
| 2017/0164349 A1 | 6/2017 | Zhu et al. | |
| 2017/0201968 A1 | 7/2017 | Nam et al. | |
| 2017/0208591 A1 | 7/2017 | Rico Alvarino et al. | |
| 2017/0215170 A1 | 7/2017 | Islam et al. | |
| 2017/0331670 A1 | 11/2017 | Parkvall et al. | |
| 2017/0332359 A1 | 11/2017 | Tsai et al. | |
| 2017/0366311 A1 | 12/2017 | Iyer et al. | |
| 2017/0367046 A1 | 12/2017 | Papasakellariou | |
| 2017/0367110 A1 | 12/2017 | Li et al. | |
| 2018/0049169 A1 | 2/2018 | Lin et al. | |
| 2018/0091267 A1 | 3/2018 | Kim et al. | |
| 2018/0092064 A1 | 3/2018 | Ryu et al. | |
| 2018/0098312 A1 | 4/2018 | Lin et al. | |
| 2018/0123844 A1 | 5/2018 | Noh et al. | |
| 2018/0146439 A1 | 5/2018 | Kim et al. | |
| 2018/0220438 A1 | 8/2018 | Liu et al. | |
| 2018/0234276 A1 | 8/2018 | Parkvall et al. | |
| 2018/0310308 A1 | 10/2018 | Loehr et al. | |
| 2018/0376414 A1 | 12/2018 | Zeng et al. | |
| 2019/0174440 A1 | 6/2019 | Kwak et al. | |
| 2019/0190751 A1* | 6/2019 | Nguyen | H04L 5/0048 |
| 2019/0238256 A1 | 8/2019 | Xing et al. | |
| 2019/0387444 A1 | 12/2019 | Byun et al. | |
| 2020/0107302 A1 | 4/2020 | Chen et al. | |
| 2020/0163024 A1* | 5/2020 | Li | H04L 27/2605 |
| 2020/0178331 A1* | 6/2020 | Xu | H04W 76/16 |
| 2020/0235887 A1* | 7/2020 | Hou | H04W 72/1263 |
| 2021/0068153 A1* | 3/2021 | Seo | H04W 72/02 |
| 2021/0091879 A1 | 3/2021 | Xing et al. | |
| 2021/0144716 A1* | 5/2021 | Choi | H04L 5/0025 |
| 2021/0176696 A1 | 6/2021 | Sebire et al. | |
| 2021/0194654 A1* | 6/2021 | Zhang | H04L 5/0091 |
| 2021/0227607 A1* | 7/2021 | Onaka | H04W 76/15 |
| 2021/0306198 A1* | 9/2021 | Gao | H04W 72/0453 |
| 2021/0314994 A1* | 10/2021 | Ang | H04L 5/001 |

FOREIGN PATENT DOCUMENTS

| | | |
|---|---|---|
| WO | WO2017172937 | 10/2017 |
| WO | WO2017196249 | 11/2017 |

OTHER PUBLICATIONS

3GPP, "Technical Specification Group Radio Access Network", E-UTRA and NR; Service Data Adaptation Protocol (SDAP) specification, 3GPP TS 37.324, vol. 1.0.0, France, Oct. 2, 2017.

Extended European Search Report dated May 21, 2021 for European Patent Application No. 19747735.9, 13 pages.

Office Action for U.S. Appl. No. 16/004,240, dated Feb. 19, 2020, Xing, "Dynamic Numerology Based on Services", 20 Pages.

Office Action for U.S. Appl. No. 16/004,240, dated May 15, 2020, Xing, "Dynamic Numerology Based on Services", 23 pages.

Office Action for U.S. Appl. No. 16/004,240, dated Dec. 27, 2019, Xing, "Dynamic Numerology Based on Services", 18 Pages.

Office Action for U.S. Appl. No. 17/111,226, dated Mar. 3, 2022, Xing, "Dynamic Numerology Based on Services", 23 pages.

Office Action for U.S. Appl. No. 16/004,240, dated Jun. 25, 2019, Xing, "Dynamic Numerology Based on Services", 18 pages.

PCT Search Report and Written Opinion dated May 8, 2019 for PCT Application No. PCT/US2019/014072, 13 pages.

* cited by examiner

DYNAMIC NUMEROLOGY BASED ON SERVICES

RELATED APPLICATIONS

This U.S. Patent Application is a continuation of, and claims priority to, U.S. patent application Ser. No. 17/111,226, filed on Dec. 3, 2020, which claims priority to U.S. patent application Ser. No. 16/004,240, filed on Jun. 8, 2018, now known as U.S. Pat. No. 10,862,613, issued on Dec. 8, 2020, which claims priority to provisional U.S. Patent Application No. 62/625,164, entitled "Dynamic Numerology with Services in Wireless," filed on Feb. 1, 2018, and provisional U.S. Patent Application No. 62/646,281, entitled "Dynamic Numerology with Services in Wireless," filed on Mar. 21, 2018, the entirety of which are incorporated herein by reference.

BACKGROUND

Multiplexing can be used to combine and transport multiple signals over a channel bandwidth. One type of multiplexing often used in wireless access technologies is orthogonal frequency-division multiplexing (OFDM). OFDM transmits data in multiple subcarriers within a larger channel bandwidth. To mitigate interference between the subcarriers, the subcarriers can be spaced apart according to a subcarrier spacing.

Some wireless access technologies, such as Long Term Evolution (LTE), use an OFDM numerology with a fixed subcarrier spacing. However, other wireless access technologies, such as fifth generation (5G) New Radio (NR), use flexible OFDM numerologies that allow scalable subcarrier spacing. Different subcarrier spacing values in these flexible OFDM numerologies can have different benefits in different situations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
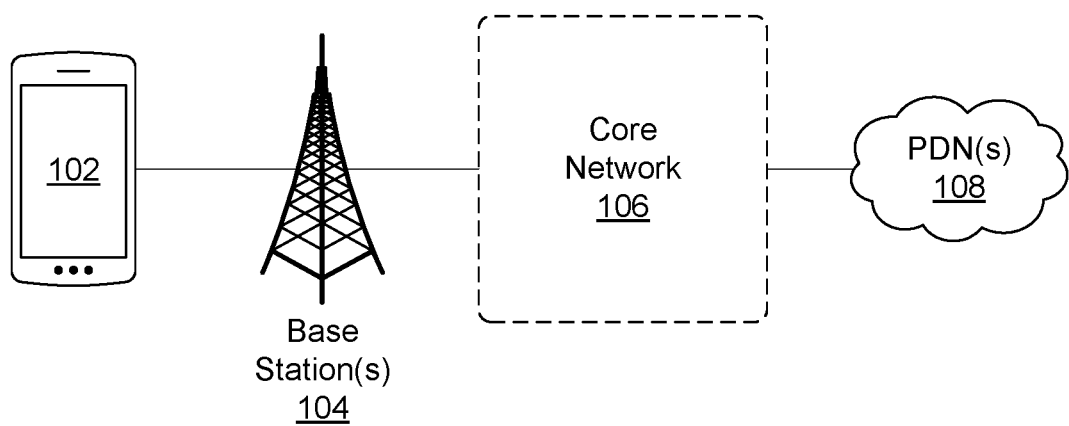
FIG. 1 depicts an exemplary environment in which user equipment (UE) can access services through a telecommunication network.

Wireless access technologies can use multiplexing, such as orthogonal frequency-division multiplexing (OFDM), to combine and transport multiple signals over a channel bandwidth. OFDM transmits data encoded into OFDM symbols in parallel using multiple subcarriers that are spread out over a larger carrier's channel bandwidth based on subcarrier spacing values. Subcarrier spacing can cause the subcarriers to be orthogonal in the frequency domain, thereby mitigating interference between the subcarriers.

Some wireless access technologies, such as Long Term Evolution (LTE), use an OFDM numerology in which the subcarrier spacing is fixed at 15 kHz. However, other wireless access technologies allow other OFDM numerologies that can vary the subcarrier spacing and/or other OFDM parameters. For example, 5G New Radio (NR) is being developed to allow scalable subcarrier spacing in which the subcarrier spacing can be set at different values including 15 kHz, 30 kHz, 60 kHz, 120 kHz, and 240 kHz.

Different OFDM numerologies that use different subcarrier spacing values can provide different benefits. For example, smaller subcarrier spacing values can lead to larger OFDM symbol durations, which can make transmissions more resilient to multi-path delay spread. As another example, larger subcarrier spacing values can lead to smaller OFDM symbol durations, which can make transmissions less sensitive to phase noise and/or increase how frequently data can be transmitted.

Accordingly, a telecommunication network may want to use different OFDM numerologies for the same user equipment (UE) in different situations. One proposed solution associates different OFDM numerologies with different bandwidth parts. In this solution, the frequencies of a carrier's channel bandwidth can be divided into multiple bandwidth parts. Individual bandwidth parts can be designated as active for UEs, such that UEs can save power by only scanning frequencies within the active bandwidth parts instead of the carrier's full channel bandwidth. Communications between a UE and a base station can use different OFDM numerologies that are associated with different bandwidth parts, depending on which bandwidth part is currently designated as active. The telecommunication network can accordingly indirectly change which OFDM numerology is used for a particular UE by sending downlink control information (DCI) to the UE that changes the active bandwidth part to another bandwidth part that is associated with a different OFDM numerology.

However, solutions that indirectly change OFDM numerologies based on active bandwidth parts only allow one OFDM numerology to be used for a UE at a time, depending on which bandwidth part is currently active. As such, even if different OFDM numerologies would be suitable for multiple different services that a single UE is using simultaneously, data for the multiple services could only be transmitted using the one OFDM numerology tied to the active bandwidth part. Moreover, instructing a UE to change the active bandwidth part in order to indirectly change the OFDM numerology can cause delays. For example, in some cases a UE's radio may take 50 us to 900 us to tune to a different bandwidth part, which may be too long for low-latency services.

Additionally, when different OFDM numerologies are tied to different bandwidth parts in different frequency bands and a UE moves to a new location that is better served by a different frequency band, an indirect OFDM numerology change may occur if a handover operation changes communications with a UE from an active bandwidth part in one frequency range to a new active bandwidth part in another frequency range that is better suited for the UE's new location. However, such handover operations are generally performed based on signal quality measurements reported by the UE to the telecommunication network, not because the telecommunication network intended to change the OFDM numerology for the UE to a different OFDM numerology better suited to a particular service that the UE is using. Accordingly, even after a mobility handover operation, the new OFDM numerology would be one linked with the new active bandwidth part, not an OFDM numerology selected because it is best suited for services that the UE is using.

This disclosure describes systems and processes through which a base station of a telecommunication network can dynamically assign one or more OFDM numerologies to a single UE, based on one or more services that a UE is using. Unlike solutions that indirectly assign OFDM numerologies solely on physical layer considerations such as an active bandwidth part, changing OFDM numerologies based on services can be an end-to-end solution that also involves a service layer, a media access control (MAC) layer, and/or other higher protocol layers at a base station.

Example Environment

FIG. 1 depicts an exemplary environment in which user equipment (UE) 102 can access services through a telecommunication network by connecting to one or more base stations 104 linked to a core network 106. The UE 102, base stations 104, and/or core network 106 can be compatible with one or more wireless access technologies, such as fifth generation (5G) technologies, Long Term Evolution (LTE)/LTE Advanced technology, Licensed Assisted Access (LAA), High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation or type of wireless access technology.

A UE 102 can be any device that can wirelessly connect to the telecommunication network via one or more base stations 104. For example, a UE 102 can be a smart phone, a cellular phone, a personal digital assistant (PDA), a personal computer (PC), a laptop, a desktop, a workstation, a media player, a tablet, a gaming device, a smart watch, an Internet of Things (IoT) sensor or device, a controller for an autonomous car, or any other type of computing or communication device.

Base stations 104 can be part of an access network that links connected UEs 102 to the core network 106. Some base stations 104 can include a gNode B (gNB) that uses 5G New Radio (NR) wireless access technology to connect to UEs 102. In some examples, a base station 104 can also, or alternately, include an eNode B (eNB) that uses LTE wireless access technology to connect to UEs 102, and/or elements compatible with any other wireless access technology. Example architecture for base station 104 is illustrated in greater detail in FIG. 6, and is described in detail below with reference to that figure.

A core network 106 can include control nodes that can manage network resources for connections with particular UEs 102. The core network 106 can also include gateways that link the core network 106 to base stations 104 and/or to packet data networks (PDNs) 108, such as an IP Multimedia Subsystem (IMS), the Internet, and/or other networks outside the core network 106. For simplicity, elements of the core network 106 are not illustrated.

A UE 102 can engage in various services through a connection to the core network 106 via one or more base stations 104. For example, a UE 102 can engage in a voice call in part by sending a request through the core network 106 to an IMS that sets up and manages voice calls. As another example, a UE 102 can engage in web browsing, data downloads, media streaming, and many other services through a connection to the Internet that passes through the core network 106. Individual services may have various performance goals or requirements related to factors including latency, reliability, throughput, positioning, and availability.

Services that a UE 102 can engage in can be broadly grouped into categories, including, but not limited to, enhanced mobile broadband (eMBB), ultra-reliable low latency communications (URLLC), massive machine type communications (mMTC), and mobile Internet of Things (M-IoT). eMBB services can be services for which a high throughput is desired, such as high definition video streaming and high-speed file transfers. URLLC services can be services for which a high reliability and/or low latency is desired, such as data transfers for remote surgery or control of flying drones or self-driving cars. mMTC and/or M-IoT services can be services for devices that may be densely populated, such as services for IoT devices and sensors. 5G NR is being developed to support eMBB, URLLC, and mMTC use cases.

A telecommunication network and individual UEs 102 can support multiple network layers based on different wireless access technologies and/or different frequency bands. As discussed above, a telecommunication network and UEs 102 can support multiple wireless access technologies, including 5G NR and LTE, and those wireless access technologies may use different frequency bands. For example, 5G NR can operate with different deployments in a wide range of frequencies extending from below 1 GHz to 100 GHz or beyond. In some examples, frequencies from 600 MHz to 1 GHz can be considered low bands for 5G NR, frequencies from 1 GHz to 6 GHz can be considered middle bands for 5G NR, and frequencies from 6 GHz to 100 GHz can be considered high bands for 5G NR, with bands above 24 GHz being referred to as millimeter wave (mmWave) bands. However, these specific frequency ranges are only examples, and in other cases different frequency ranges can be considered low, middle, and high bands for 5G NR.

Within supported frequency bands, actual transmissions can occur within individual carriers that have smaller channel bandwidths. For example, a 5G NR base station 104 can be configured to use a 600 MHz band known as n71 in 3GPP standards, but send data within carriers that have channel bandwidths of 5 MHz, 10 MHz, 15 MHz, or 20 MHz in that 600 MHz band. In this example, if a carrier with a channel bandwidth of 5 MHz is used in the 600 MHz band, a 5G NR base station 104 can be configured to use any unlimited and/or cleared Resource Block within the carrier, in some cases via bandwidth parts selected from the larger carrier.

Figure 2:
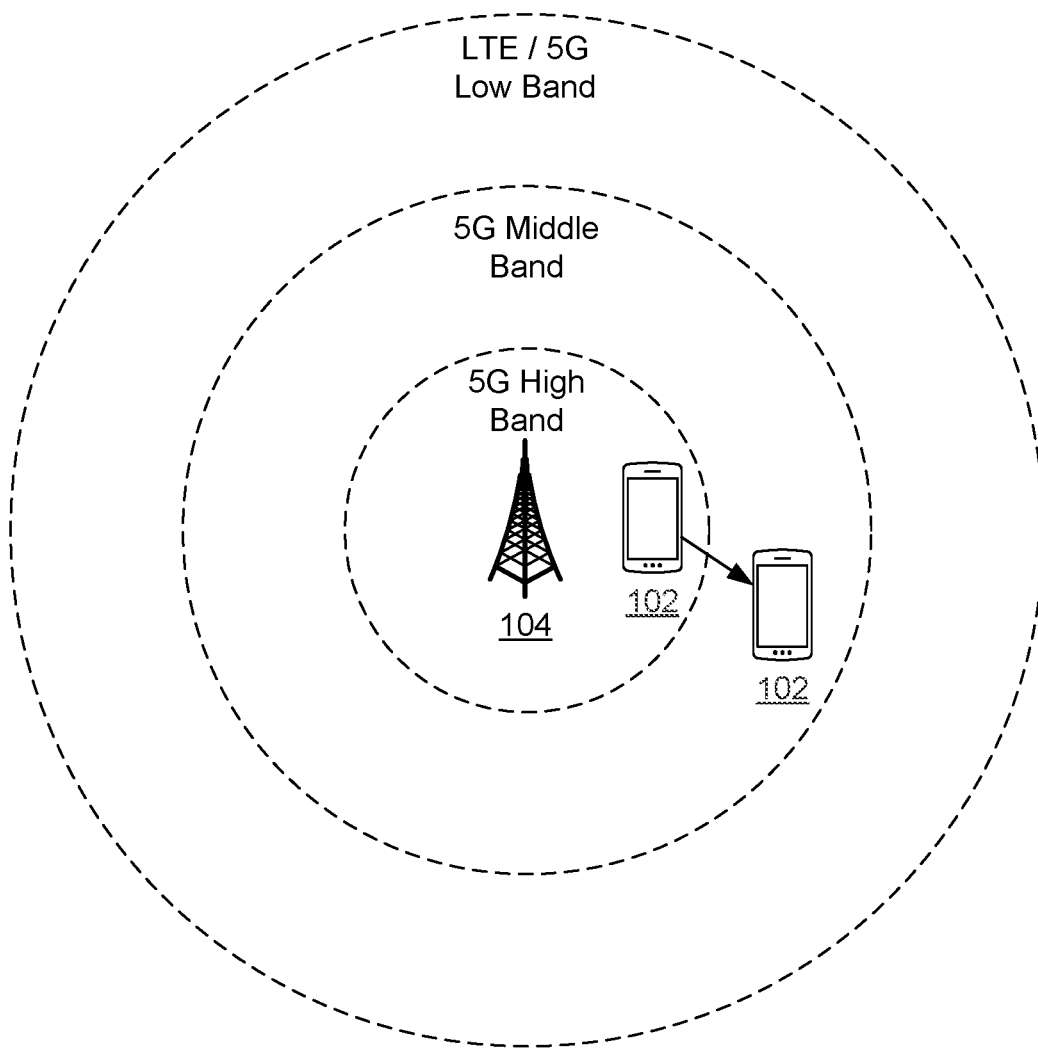
FIG. 2 depicts an example in which a base station supports transmissions in frequencies corresponding to multiple bands.

FIG. 2 depicts an example in which a base station 104 supports transmissions in frequencies corresponding to a 5G high band, frequencies corresponding to a 5G middle band, and frequencies corresponding to a 5G low band and/or an LTE band. As shown in FIG. 2, in some examples the frequencies of the 5G high band can cover a cell with a smaller geographical area than a cell covered by the frequencies of the 5G middle band, while the frequencies of the 5G low band and/or LTE band can cover a cell with a larger geographical area than the cell covered by the frequencies of the 5G middle band.

A UE 102 can have one or more antennas that cause it to be compatible with multiple wireless access technologies and/or frequency bands. In some cases, this compatibility can allow a UE 102 to connect to a telecommunication network using multiple wireless access technologies and/or frequency bands simultaneously. In other cases, this compatibility can allow a UE 102 to transition between using different wireless access technologies and/or frequency bands at different times, such as moving from an overlay 5G network to an LTE network. As an example, when a UE 102 physically moves from a location covered by a 5G high band into a location covered by a 5G middle band as shown in FIG. 2, a handover operation can be performed so that the communications between the base station 104 and the UE 102 use frequencies in the 5G middle band instead of frequencies in the 5G high band.

In some cases, base stations 104 can assign UEs 102 to particular network layers based on admission control and/or load control policies. For example, when a UE 102 is first turned on and connects to a base station 104, admission control and/or load control policies can be used to instruct that UE 102 to connect to a particular base station 104 via a particular wireless access technology and/or frequency band, such as assigning a UE 102 to connect to a base station 104 via LTE if 5G NR resources are not currently available. After this initial connection, load control policies can be used to handover a UE 102 between base stations 104 and/or network layers. For example, if a UE 102 was initially assigned to an LTE network layer, but 5G NR resources later become available, communications for the UE 102 can be switched to a 5G network layer.

Figure 3:
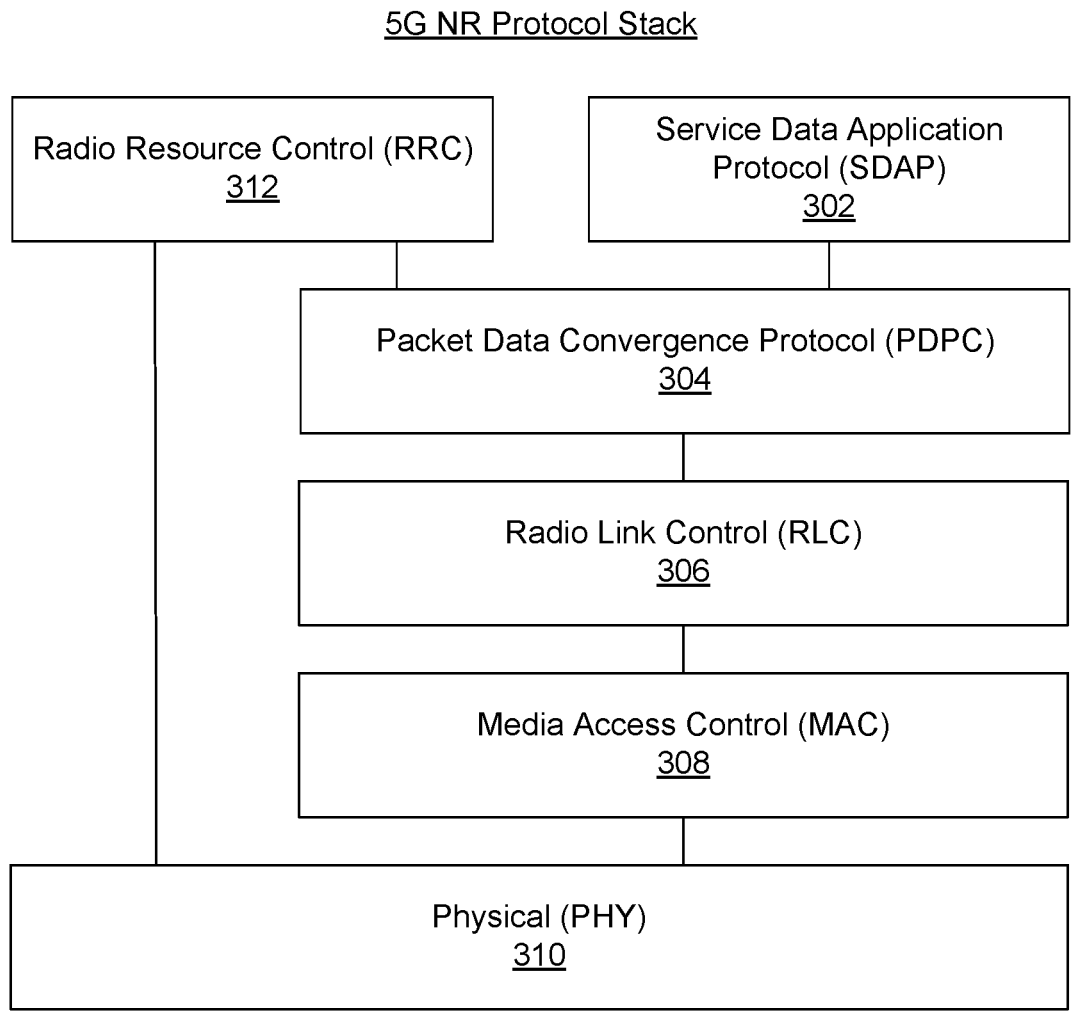
FIG. 3 depicts a protocol stack that can be used by UEs and base stations in 5G New Radio (NR) communications.

FIG. 3 depicts a protocol stack that can be used by UEs 102 and base stations 104 in 5G NR communications. The 5G NR protocol stack includes protocol layers involved in a user plane, including a Service Data Adaptation Protocol (SDAP) layer 302, Packet Data Convergence Protocol (PDCP) layer 304, a Radio Link Control (RLC) layer 306, a Media Access Control (MAC) layer 308, and a physical (PHY) layer 310. In the control plane, the 5G NR protocol stack can include a Radio Resource Control (RRC) layer 312, the PDPC layer 304, the RLC layer 306, the MAC layer 308, and the physical layer 310. In some cases, the RRC layer 312 can be linked directly to the physical layer 310, as well as to the PDPC layer 304. Communications using other wireless access technologies can involve similar protocol stacks, although some, including the LTE protocol stack, may lack an upper SDAP layer 302 in the user plane.

At the SDAP layer 302, a Quality of Service (QoS) flow can be mapped to a particular data radio bearer between a UE 102 and a base station 104, and a corresponding QoS flow ID can also be marked in data packets of the QoS flow. Accordingly, a base station 104 can identify traffic associated with particular services or service categories, and/or desired performance attributes for those services or service categories, at the SDAP layer 302 based on parameters such as a QoS flow ID and/or an associated QoS Class Identifier (QCI).

PDCP layer 304 functions can include header compression, ciphering, and integrity protection. RLC layer 306 functions can include error detection, segmentation, and resegmentation. MAC layer 308 functions can include error correction, scheduling, and prioritization, as well as other functions described below.

At the physical layer 310, data can be sent or received using an air interface associated with a wireless access technology. When a base station 104 sends data, the base station's physical layer 310 can receive data from the MAC layer 308 and wirelessly transport that data over the air in a waveform. A multiplexing scheme, such as orthogonal frequency-division multiplexing (OFDM), can be used at the physical layer 310 to transmit multiple data streams simultaneously. For example, a base station 104 can use OFDM to transmit different data streams to one or more UEs 102.

As will be described in more detail below, an OFDM numerology for communications with a UE 102 can be selected at a base station's MAC layer 308 and be implemented at the physical layer 310. Additionally, an assignment of the selected OFDM numerology can be sent from the base station's RRC layer 312 to the UE 102 via the physical layer 310, to inform the UE 102 which OFDM numerology will used.

Figure 4:
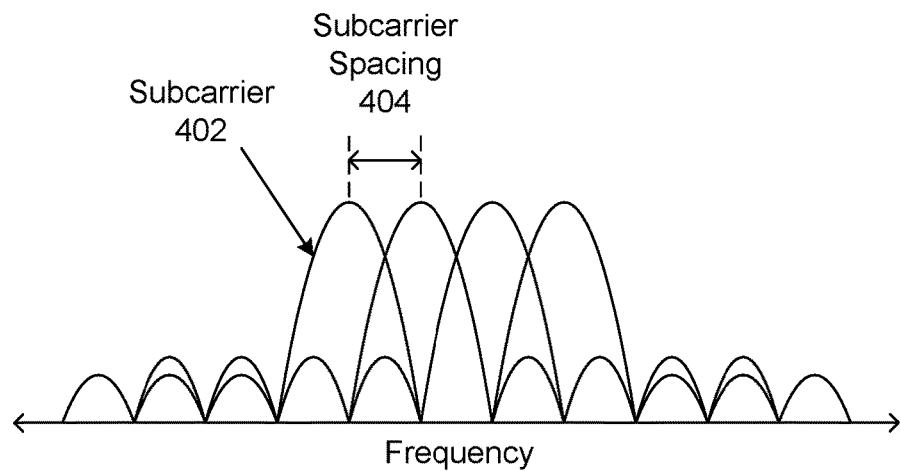
FIG. 4 depicts an example OFDM waveform, in which data can be transmitted in subcarriers spaced apart by a subcarrier spacing.

FIG. 4 depicts an example OFDM waveform, which can be used to combine and transport multiple signals over a carrier's channel bandwidth. In OFDM, data streams can be encoded into OFDM symbols in part based on operations such as an inverse Fourier Transform. A receiver can perform an operation, such as a Fourier Transform, on received OFDM symbols to recover an original data stream.

OFDM symbols for different data streams can be transmitted in parallel using different subcarriers 402, which can lead to a high spectral efficiency relative to many other modulation schemes. The subcarriers 402 of an OFDM waveform can be spread out over a larger carrier's channel bandwidth based on subcarrier spacing 404 that causes individual subcarriers 402 to be orthogonal in the frequency domain. For example, as shown in FIG. 4, subcarrier spacing 404 can be chosen such that peaks of individual subcarriers 402 are positioned at frequencies where other subcarriers 402 have nulls. This orthogonality can mitigate interference between the subcarriers 402.

In some cases, because multipath propagation can cause a loss of orthogonality between subcarriers 402, portions of the ends of the OFDM symbols can be added to the beginning of the OFDM symbols as cyclic prefixes (CPs). The CPs can serve as guard intervals that space out the OFDM symbols, and/or can help a receiver distinguish between the OFDM symbols. In some examples, normal or extended CP types can be used in different situations or with certain subcarrier spacing 404 values, as will be discussed further below.

The subcarrier spacing 404 can be inversely proportional to the length of the OFDM symbols, such that larger subcarrier spacing 404 values can be associated with shorter OFDM symbols, while shorter subcarrier spacing 404 values can be associated with longer OFDM symbols. In some cases, the length of CPs can similarly scale depending on the subcarrier spacing 304 in order to maintain a ratio of the length of the CPs to the overall length of the OFDM symbols.

An OFDM numerology can refer to a subcarrier spacing 404 value, a CP type, and/or any other attribute that describes an OFDM waveform. Accordingly, in some examples one or more OFDM numerologies can be used for communications with a UE 102 depending on selected subcarrier spacing 404 values, selected CP types, and/or other factors.

Figure 5:
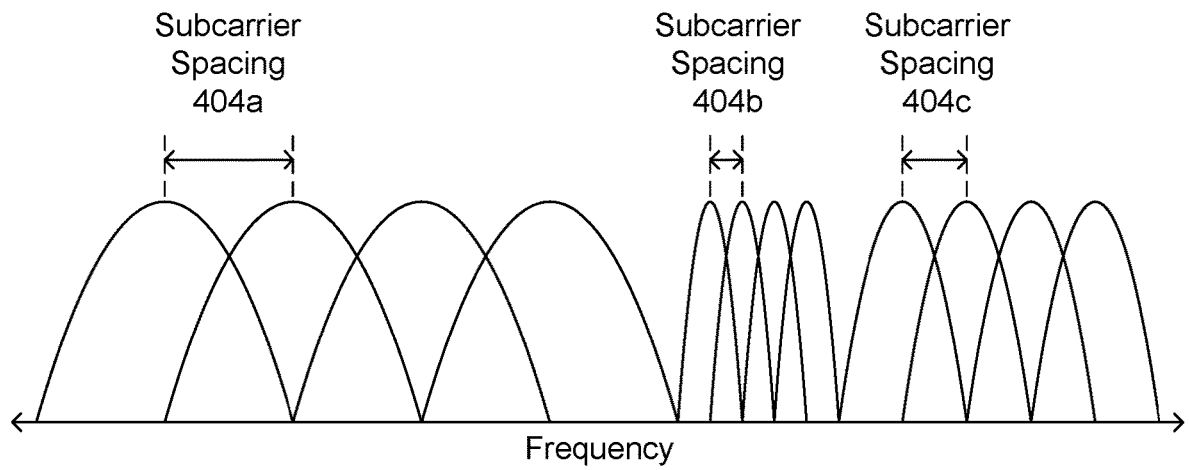
FIG. 5 depicts an example of an OFDM waveform in which subcarrier spacing can vary between different subcarriers.

In some wireless access technologies, the subcarrier spacing 404 can be fixed at a specific value. For instance, in LTE the subcarrier spacing 404 is generally fixed at 15 kHz. However, in 5G NR and some other wireless access technologies, the subcarrier spacing 404 can be scalable to different values. This can allow the subcarrier spacing 404 to vary between different subcarriers 402 in 5G NR transmissions, as shown in the example of FIG. 5. In particular, the scalable subcarrier spacing 404 in 5G NR can be set at values determined by the equation $2^{\mu} \cdot 15$ kHz, where $\mu$ is a non-negative integer. Subcarrier spacing 404 in 5G NR can accordingly be set at values including 15 kHz, 30 kHz, 60 kHz, 120 kHz, and 240 kHz. In some examples, different OFDM numerologies can be referred to using different values for $\mu$, as different values for $\mu$ can define different subcarrier spacing 404 values.

Because different subcarrier spacing 404 values can be associated with OFDM symbols of different lengths, different numbers of OFDM symbols can be sent during the same period of time when different OFDM numerologies are used. For example, data can be scheduled to be sent within subframes of 1 ms each, with ten subframes fitting into a 10 ms radio frame. Depending on the subcarrier spacing 404, such subframe can have a different number of slots for OFDM symbols. When different OFDM numerologies are used, the different OFDM numerologies can align on OFDM symbol boundaries in the time domain, such as every 1 ms between subframes.

The number of OFDM symbols that can fit into each slot can vary according to a CP type. In some examples, a normal CP type can allow 14 OFDM symbols to fit into each slot, while an extended CP type can allow 12 OFDM symbols to fit into each slot. In some examples, a normal CP can be used with subcarrier spacing 404 values of 5 kHz, 30 kHz, 60 kHz, 120 kHz, and 240 kHz, while an extended CP can also be used with a 60 kHz subcarrier spacing 404. The table below shows a non-limiting example of different OFDM numerologies associated with different subcarrier spacing 404 values and CP types, which can vary the number of slots per subframe and thus the total number of OFDM symbols that can be sent per subframe.

| $\mu$ | Subcarrier Spacing and CP Type | Number of OFDM Symbols per Slot | Number of Slots per 1 ms Subframe | Number of OFDM Symbols per 1 ms Subframe |
|---|---|---|---|---|
| 0 | 15 kHz (Normal CP) | 14 | 1 | 14 |
| 1 | 30 kHz (Normal CP) | 14 | 2 | 28 |
| 2 | 60 kHz (Normal CP) | 14 | 4 | 56 |
| 2 | 60 kHz (Extended CP) | 12 | 4 | 48 |
| 3 | 120 kHz (Normal CP) | 14 | 8 | 112 |
| 4 | 240 kHz (Normal CP) | 14 | 16 | 224 |

In some cases, a smaller subcarrier spacing 404 value can be desired because the associated OFDM symbols are larger, even though fewer can be transmitted during a given period of time. For example, because larger OFDM symbols include larger CPs copied from the ends of OFDM symbols, a smaller subcarrier spacing 404 value might be used when copies of the data at the ends of OFDM symbols may be needed to reliably decode the OFDM symbols. On the other hand, in some cases a larger subcarrier spacing 404 value can be desired because the associated OFDM symbols are smaller and can be transmitted more frequently.

Although multiple OFDM numerologies may be possible, a base station 104 can assign one or more OFDM numerologies for communications with a UE 102 based on parameters of one or more services being used by that UE 102. In some cases, in addition to parameters of services being used by the UE 102, the base station 104 can also select one or more of the allowable ODFM numerologies for communications with the UE 102 based on network attributes, operator policies, and/or other factors.

When a UE 102 is initially turned on or moves into a cell, it can attach to a base station 104 and be synchronized to the telecommunication network in the control plane. The base station 104 can broadcast system information from the RRC layer 312, such as in System Information Blocks or Synchronization Signal Blocks. This system information can include a default ODFM numerology used by the base station 104, such that the UE 102 can use that default ODFM numerology to communicate with the base station 104. After a UE 102 has attached to a base station 104 using a default ODFM numerology, the UE 102 can request initiation of one or more services through its connection to the core network 106 via the base station 104.

When a UE 102 engages in a service, data packets associated with the service can pass through a base station 104. As described above, data for the service can be encoded and transmitted between the UE 102 and the base station 104 in one or more subcarriers 402 of an OFDM waveform at the physical layer 310. However, the base station 104 can analyze data packets at one or more protocol layers above the physical layer 310 to identify service attributes, determine service parameters associated with the service attributes, and use the service parameters to select an associated OFDM numerology to use for transmissions associated with the service. For example, the base station 104 can review data packets of a request for a new service, determine an OFDM numerology to use for that service, and then use that OFDM numerology for subsequent transmissions associated with the service. The base station 104 can also inform the UE 102 of the selected OFDM numerology via an RRC reconfiguration message, via downlink control information (DCI) in a Physical Downlink Control Channel (PDCCH), or via any other type of message.

In some examples, data packets for a particular service can be transmitted as part of a flow associated with a QoS Flow ID, which in 5G NR can be analyzed at a base station's SDAP layer 302. The base station 104 can accordingly use a QoS flow ID associated with data packets of a service to determine a QCI and/or one or more QoS parameters associated with the service. In other examples, a base station 104 can also, or alternately, evaluate IP addresses or other information in headers of data packets at one or more protocol layers above the physical layer 310. Such header information can be used to identify a server that is sending or receiving the data packets, and accordingly to identify a service known to be associated with that server.

In still other examples, the core network 106 can review traffic for different services from one or more UEs 102 connected to one or more base stations 104, and categorize or identify services for the base stations 104. For example, a core network 106 can group service into service instances for smartphones, autonomous cars, virtual reality, video and sports, IoT remote sensors and meters, and other applications. The core network 106 can map services instances into different network slices and inform base stations 104 which network slices and associated service instances or types of services they are to handle.

The base station 104 can use the identity of a service and/or one or more other attributes associated with the service to determine desired performance goals or requirements. For example, one or more service attributes can reflect performance requirements or goals related to factors such as latency, reliability, availability, data rate, or packet loss. Other service attributes can be associated with a QCI, QoS parameters, Quality of Experience (QoE) parameters, a priority level, a package length, a Service Profile Identifier (SPID), an Allocation and Retention Policy (ARP) that indicates a priority level for the allocation and retention of bearers and can be used to decide whether to accept a request to establish a bearer or reject the request if network resources are limited, and/or any other parameter than can indicate a service attribute. The base station 104 can use the service attributes to select a OFDM numerology that provides benefits corresponding to the service parameters.

In some cases, the base station 104 or the core network 106 can categorize a service, based on its service attributes, as being an eMBB service, a URLLC service, or an mMTC service. For example, a service associated with a QoS Flow ID that corresponds to QoS parameters indicating that data for the service should be delivered at a high priority and at a low latency may be considered a URLLC service. As another example, a service associated with QoS parameters indicating that data for the service is to be delivered at a high guaranteed bitrate may be considered an eMBB service. In some cases, the base station 104 can be preconfigured with specific OFDM numerologies associated with an eMBB service category, an URLLC service category, and an mMTC service category. Accordingly, the base station 104 can assign an OFDM numerology to traffic of a service based on the service's classification as an eMBB service, URLLC service, or mMTC service.

In some cases, a base station 104 can alternately, or additionally, review individual service attributes to determine an OFDM numerology for a service. For instance, when a service attribute indicates that low latency is desired for the service, the base station may select an OFDM numerology with a relatively large subcarrier spacing 404 associated with relatively small OFDM symbols, because smaller OFDM symbols can be transmitted more frequently than larger OFDM symbols and thereby assist with lowering latency.

In some examples, a base station 104 can determine a subset of allowable OFDM numerologies based on an initial categorization of a service as an eMBB service, URLLC service, or mMTC service, and then choose a particular OFDM numerology from that subset based on the service's specific attributes. For instance, a base station 104 or core network 106 may initially categorize a service as an eMBB service, such that the base station 104 can determine that a preconfigured subset of OFDM numerologies for eMBB services includes 30 kHz and 60 kHz subcarrier spacing 404. Out of that subset, the base station 104 can then choose 60 kHz subcarrier spacing 404 because the service's specific latency goals are better served by longer OFDM symbols.

In some examples, a base station 104 can be configured a database that associates known services with specific OFDM numerologies, or subsets of allowable OFDM numerologies. Accordingly, if a base station 104 or core network 106 is able to identify a particular service from an IP header or other information in these examples, the base station 104 can assign an OFDM numerology associated with that service in the list or database.

In addition to service attributes, in some examples a base station 104 can also take into account network attributes and/or operator policies when dynamically assigning one or more OFDM numerologies to a UE 102. For example, a base station 104 may select an OFDM numerology for communications associated with a particular service based both on attributes of the service as well as on network attributes and/or operator policies.

In some examples, network attributes can define specific frequency bands supported by base stations 104 in licensed and/or unlicensed spectrum. For example, 5G NR base stations 104 can be set to use a 600 MHz band known as n71 in 3GPP standards, a 28 GHz band known as n257 in 3GPP standards, and/or a 39 GHz band known as n260 in 3GPP standards. Network conditions can also include radio frequency link conditions, key performance indicators, current loads on a base station 104 and/or other base stations 104, interference levels, mobility capabilities of UEs 102, movement speeds of UEs 102, and/or other network conditions.

In some examples, operator policies can identify one or more allowable OFDM numerologies that are associated with frequency bands supported by the base stations 104. For example, when 5G NR base stations support n71, n257, and n260 bands as discussed above, an exemplary operator policy can indicate that 15 kHz and 30 kHz subcarrier spacing 404 values can be used for data channels in the n71 band, while 60 kHz, 120 kHz, and 240 kHz subcarrier spacing 404 values can be for data channels in the n257 and n260 bands. In this example, an operator policy can additionally indicate that subcarrier spacing 404 of 15 kHz can be used for synchronization in the n71 band, subcarrier spacing 404 of 120 kHz can be used for synchronization in the n257 band, and subcarrier spacing 404 of 120 kHz or 240 kHz subcarrier spacing 404 can be used for synchronization in the n260 band.

Additionally, in some examples operator policies can instruct a base station 104 to select between specific OFDM numerologies based in part on particular channel bandwidths being used for a carrier. For example, an operator policy can indicate that a 5G NR base station 104 can use 15 kHz subcarrier spacing 404 when a carrier in the n71 band has a 5 MHz channel bandwidth, but can select between 15 kHz subcarrier spacing 404 and 30 kHz subcarrier spacing 404 when a carrier in the n71 band has a larger channel bandwidth such as 10 MHz, 15 MHz, or 20 MHz.

Operator policies can also include other types of policies, such as flow control policies, traffic splitting policies, policies related to cell types and/or wireless access technologies, caching control policies, mobile management policies, service continuity policies, satellite access policies, and fixed broadband access policies.

Flow control policies can, at a base station's PDCP layer 304, indicate how traffic of flows for certain services or certain types of services should be treated. A base station 104 can accordingly select an OFDM numerology for traffic of a service that provides benefits that corresponds with goals in an associated flow control policy.

A traffic splitting policy can be used in radio resource management at base stations 104 to split traffic among network layers or base stations 104 based on service types. For example, a traffic splitting policy can indicate that data for voice calls should be delivered via LTE, while data for media streaming should be delivered via 5GNR. Accordingly, a traffic splitting policy can be used to determine which network layers certain services should be delivered on, and accordingly which OFDM numerologies are allowed for those network layers.

A cell type policy can indicate allowable OFDM numerologies based on whether a cell is a macro cell, a small or micro cell, a femtocell, a picocell, or any other type of cell. A wireless access technology policy can indicate allowable OFDM numerologies based on whether a base station uses LTE, 5G, or other wireless access technologies. A service policy can be related to the service attributes discussed above, and indicate allowable OFDM numerologies for specific types of services, such data services, voice services, services for IoT devices, video-based services such as live streaming or virtual reality, vehicle-to-vehicle services, or any other kind of service. A caching control policy can indicate allowable OFDM numerologies based on delivery of content from a content caching application. A mobile management policy can indicate allowable OFDM numerologies for a UE 102 or a group of UEs 102 that use certain access technology changes for some or all connections. A service continuity policy can indicate allowable OFDM numerologies that can prioritize minimal packet loss during inter and intra wireless access technology changes for a UE 102. Satellite access and fixed broadband access policies can indicate allowable OFDM numerologies for services provided in part over satellite access or fixed broadband access.

As described above, after a UE 102 attaches to a base station 104 and communications have been established using a default OFDM numerology identified by the base station in system information broadcasts, the UE 102 can begin engaging in one or more individual services. When the UE 102 sends a request to initiate such a service, the base station 104 can use service attributes, network attributes, and/or operator policies to select a specific OFDM numerology to use for communications with the UE 102 for that service. The base station 104 can also inform the UE 102 of the selected OFDM numerology for that service in an RRC reconfiguration message, in DCI in PDCCH, or via any other type of message. Accordingly, the selected OFDM numerology can be used to carry data in subsequent transmissions associated with the service.

In some cases, the base station 104 can also determine and assign a particular frequency band and/or carrier for transmissions associated with a specific service using a selected OFDM numerology. For example, the base station 104 may be configured to select between a high mmWave frequency band along with an OFDM numerology with large subcarrier spacing 404 for URLLC services, a middle frequency band with an OFDM numerology with medium subcarrier spacing 404 for URLLC services, eMBB service, mMTC service, or M-IoT services, or a low frequency band with small subcarrier spacing 404 for eMBB services and other low latency services.

If a handover operation moves a UE 102 to a different network layer that uses a different frequency band and/or wireless access technology, a base station 104 can accordingly review the service attributes, network attributes, and/or operator policies to determine if an OFDM numerology should be changed. For example, a UE 102 may move from a location served by a first 5G NR band that allows subcarrier spacing 404 values of 60 kHz and 120 kHz to a new location served by a second 5G NR band that allows subcarrier spacing 404 values of 15 kHz and 30 kHz. If transmissions for a particular service had been transmitted to the UE 102 at a 60 kHz in the first 5G NR band, a base station 104 may change the OFDM numerology to 30 kHz when the UE 102 moves to the second 5G NR band. However, if the second 5G NR band also allowed 60 kHz subcarrier spacing 404, the base station 104 may keep the OFDM numerology at 60 kHz for transmissions associated with the service if allowed by other network attributes and/or operator policies. As another example, if a UE 102 moves from a 5G band to an LTE band and the subcarrier spacing 404 for transmissions associated with a service had been set at a subcarrier spacing 404 above 15 kHz, the subcarrier spacing 404 can be changed to 15 kHz because subcarrier spacing 404 is fixed at 15 kHz for LTE.

When the UE 102 is engaged in multiple services at the same time, the same or different OFDM numerologies can be used for different subcarriers 402 used to transmit data for the different services. For example, when a UE 102 is engaged in different services that have attributes that are best served by different OFDM numerologies, those different OFDM numerologies can be used for different subcarriers 402 that transmit data of the different services for the same UE 102. In some cases, different frequency bands can be used to transmit data for different services for the UE based on different OFDM numerologies. In other cases, different OFDM numerologies can be used to transmit data for different services in the same frequency band, such as for subcarriers 402 in different carriers within the same larger frequency band.

In some example, when a base station 104 determines that a single UE 102 is engaged in multiple services and some of the services share a category, latency requirement, or other parameter, the base station 104 can select a frequency band, carrier, and/or OFDM numerology for each group of services with shared parameters. For instance, if a UE 102 is engaged in a first service and a second service that have similar parameters, as well as a third service that has different parameters, the base station 104 can assign a first OFDM numerology for the first and second services, and a second OFDM numerology for the third service.

Example Architecture

Figure 6:
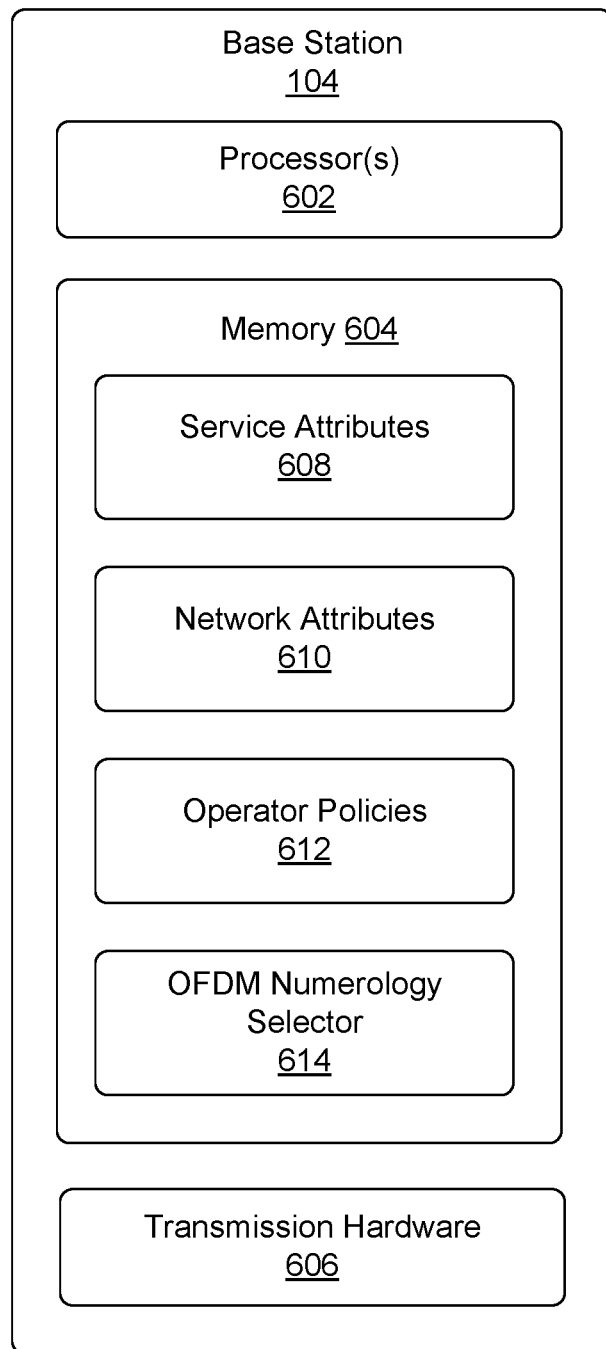
FIG. 6 depicts an example system architecture for a base station.

FIG. 6 depicts an example system architecture for a base station 104, in accordance with various examples. As shown, a base station 104 can include processor(s) 602, memory 604, and transmission hardware 606. The memory 604 can store service attributes 608, network attributes 610, operator policies 612, and/or an OFDM numerology selector 614.

In various examples, the processor(s) 602 can be a central processing unit (CPU), a graphics processing unit (GPU), both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in the memory 604, which can be associated with common types of volatile (RAM) and/or nonvolatile (ROM) memory.

In various examples, memory 604 can include system memory, which may be volatile (such as RAM), non-volatile (such as ROM, flash memory, etc.) or some combination of the two. The memory 604 can also include additional data storage devices (removable and/or non-removable) such as, for example, magnetic disks, optical disks, or tape. Memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The transmission hardware 606 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102 and a core network 106, transmit data, and monitor the connections. The transmission hardware 606 can support transmissions in one or more frequency bands using one or more wireless access technologies, as discussed above. At the physical layer 310, the transmission hardware 606 can also support transmitting multiple data streams in parallel in different subcarriers 402 of an OFDM waveform as discussed above, including at different subcarrier spacing values 404 in the same or different frequency bands.

In some examples, service attributes 608 can include information about known services, such service names or associated IP addresses. Service attributes 608 can also include parameters associated with such known services, such as performance goals or requirements related to latency, reliability, availability, data rate, and/or packet loss, a QCI, QoS parameters, QoE parameters, a priority level, a package length, an SPID, an ARP, and/or other parameters. In other examples, the service attributes 608 can include information that can associate QCI flow IDs, service categories, or other attributes of a service with one or more performance goals, performance requirements, or specific parameters.

Network attributes 610 can include information about supported frequency bands in licensed and/or unlicensed spectrum, radio frequency link conditions, key performance indicators, current loads on a base station 104 and/or other base stations 104, interference levels, mobility capabilities of UEs 102, movement speeds of UEs 102, and/or other network conditions.

Operator policies 612 can include information identifying allowable OFDM numerologies that are associated with supported frequency bands and/or channel bandwidths, as well as other policies such as flow control policies, traffic splitting policies, policies related to cell types and/or wireless access technologies, caching control policies, mobile management policies, service continuity policies, satellite access policies, and fixed broadband access policies.

An OFDM numerology selector 614 can include data and/or computer-executable instructions that can determine one or more OFDM numerologies for communications with a UE 102, based at least in part on services being used by the UE 102. The OFDM numerology selector 614 can have components positioned at one or more protocol layers that are higher than the physical layer 310. For example, in some cases a first portion of the OFDM numerology selector 614 can be at a 5G NR base station's upper SDAP layer 302 to analyze data packets and identify traffic of particular services, a second portion of the OFDM numerology selector 614 can be at the MAC layer 308 to select one or more specific OFDM numerologies for identified services or service types and to instruct the physical layer 310 to use to those OFDM numerologies to transmit associated data, and a third portion of the OFDM numerology selector 614 can be at the RRC layer 312 to send an RRC reconfiguration message or other type of message that informs the UE 102 which OFDM numerologies have been selected. In some cases, portions of the OFDM numerology selector 614 can also be considered part of a Radio Resource Manager or other element that schedules data transmissions on different subcarriers 402.

The OFDM numerology selector 614 can use the service attributes 608 to analyze data that is to be sent to a UE 102, and identify one or more associated performance goals or requirements. The OFDM numerology selector 614 can select an OFDM numerology for each of the services based on the associated performance goals or requirements. The OFDM numerology selector 614 can also consider the network attributes 610 and/or operator policies 612 when selecting OFDM numerologies for data of particular services, such as selecting an OFDM numerology for data of a service that is allowed by an operator policy 612 for a frequency band that network attributes 610 indicate is supported and is not currently congested.

Example Operations

Figure 7:
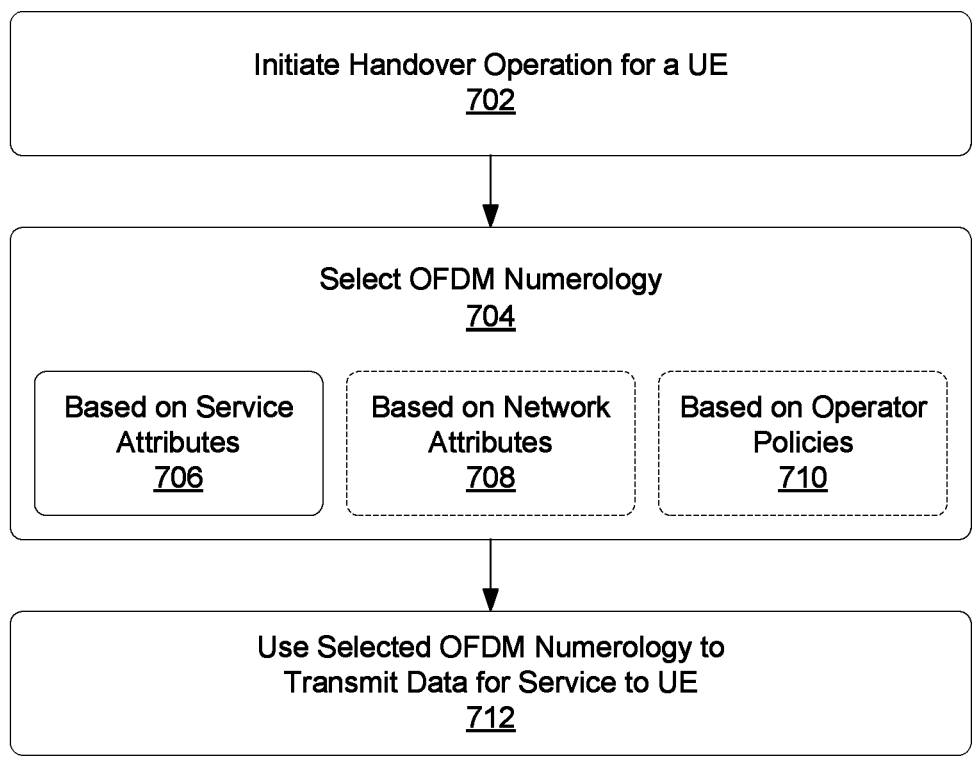
FIG. 7 depicts a flow chart of an exemplary process for selecting an OFDM numerology for data of a service when a handover operation is performed.

FIG. 7 depicts a flow chart of an exemplary process for selecting an OFDM numerology for data of a service when a handover operation is performed. In some examples, the process of FIG. 7 can be performed by a base station 104 when a load control policy reassigns a UE 102 to a different network layer and/or wireless access technology, or when a UE 102 moves to a new location serviced by a different network layer and/or wireless access technology.

At block 702, the base station 104 can initiate a handover operation for a UE 102. In some examples, the base station 104 may initiate a handover operation to transfer communications for the UE 102 to a different network layer that is supported by that base station 104, such as when signal quality measurements reported by the UE 102 indicate the UE 102 may receive data at a stronger signal strength if the data is sent using a different frequency band and/or wireless access technology. In other examples, the base station 104 may initiate a handover operation when it takes over communications for the UE 102 from another base station 104 based on movement of the UE 102 or a load control policy.

At block 704, the base station 104 can select an OFDM numerology for communications with the UE 102. Selection of the OFDM numerology can be based, at sub-block 706, on service attributes associated with a service that the UE 102 is engaged in at the time of the handover operation. For example, the UE 102 may be engaged in a service such as a voice call at the time the base station 104 takes over communications for the UE 102 from another base station 104 or transfers the UE's communications to a different network layer. The base station 104 can analyze data packets at a SDAP layer 302 or other protocol layer higher than the physical layer 310 to identify a service, a service category, a QoS Flow ID, and/or associated performance goals or requirements related to latency, reliability, availability, data rate, and/or packet loss, a QCI, QoS parameters, QoE parameters, a priority level, a package length, an SPID, an ARP, and/or other parameters. In some cases, the core network 106 can review traffic associated with the UE 102 to determine one or more service attributes, and inform the base station 104 of those determined service attributes.

The base station 104 can then determine an OFDM numerology associated with benefits that can help meet the desired performance goals or requirements. For example, the base station 104 can determine that data packets for the UE 102 are associated with a service that has a low latency goal, and accordingly select an OFDM numerology associated with shorter OFDM symbols that can be sent more frequently in order to meet the low latency goal.

In some examples, selection of the OFDM numerology during block 704 can additionally include selecting the OFDM numerology based on network attributes at sub-block 708 and/or based on operator policies at sub-block 710. For example, if the handover operation moved the UE 102 to an LTE band for which only 15 kHz subcarrier spacing 404 is allowed, the base station 104 can select an OFDM numerology with 15 kHz subcarrier spacing 404. However, if the handover operation moved the UE 102 to a particular 5G NR frequency band that supports more than one OFDM numerology according to an operator policy, the base station 104 can select one of the supported OFDM numerologies for that 5G NR frequency band.

At block 712, the base station 104 can transmit data for the service to the UE 102 in subcarriers 402 using the selected OFDM numerology. The base station 104 can also send a message to the UE 102 indicating which OFDM numerology has been selected for the service, such that the UE 102 can use that selected OFDM numerology to receive data for the service. For example, the base station 104 can instruct the UE 102 to use the selected OFDM numerology in an RRC reconfiguration message, in DCI in PDCCH, or in any other type of message.

As one non-limiting example, if an OFDM numerology with 15 kHz subcarrier spacing 404 had been used before the handover operation for data of a particular service, but the UE 102 has moved into a different cell that uses a different frequency band that supports 60 kHz and the base station 104 determines that 60 kHz is best suited to the parameters of the service, the base station 104 can inform the UE 102 that 60 kHz subcarrier spacing will be used for data of that service following the handover operation.

As another non-limiting example, if the UE 102 moves from a cell in which 15 kHz subcarrier spacing 404 had been used for data of a particular service to another cell that supports both 15 kHz and 60 kHz subcarrier spacing 404, but the base station 104 determines that 15 kHz subcarrier spacing 404 is best suited to the parameters of the service, the base station 104 can continue using 15 kHz subcarrier spacing 404 for data of the service following the handover operation. In some examples, the base station 104 can inform the UE 102 that the same subcarrier spacing 404 will be used following the handover operation, while in other example the base station 104 may avoid sending such a message to the UE 102 if the previous subcarrier spacing 404 will continue to be used.

In some examples in which handover operations are performed, a base station 104 can take into a speed of how quickly the UE 102 is moving. For example, if the UE 102 is moving slowly within the same cell served by the same network layer, the base station 104 may keep the subcarrier spacing 404 constant, or change it less frequently, as the UE 102 moves around the cell. In contrast, if the UE 102 is on a high speed train and is begin switched between multiple base stations 104 relatively quickly as it moves, the base stations 104 can change the subcarrier spacing 404 relatively often depending on allowable OFDM numerologies associated with the specific network layers and policies supported by those base stations 104.

Figure 8:
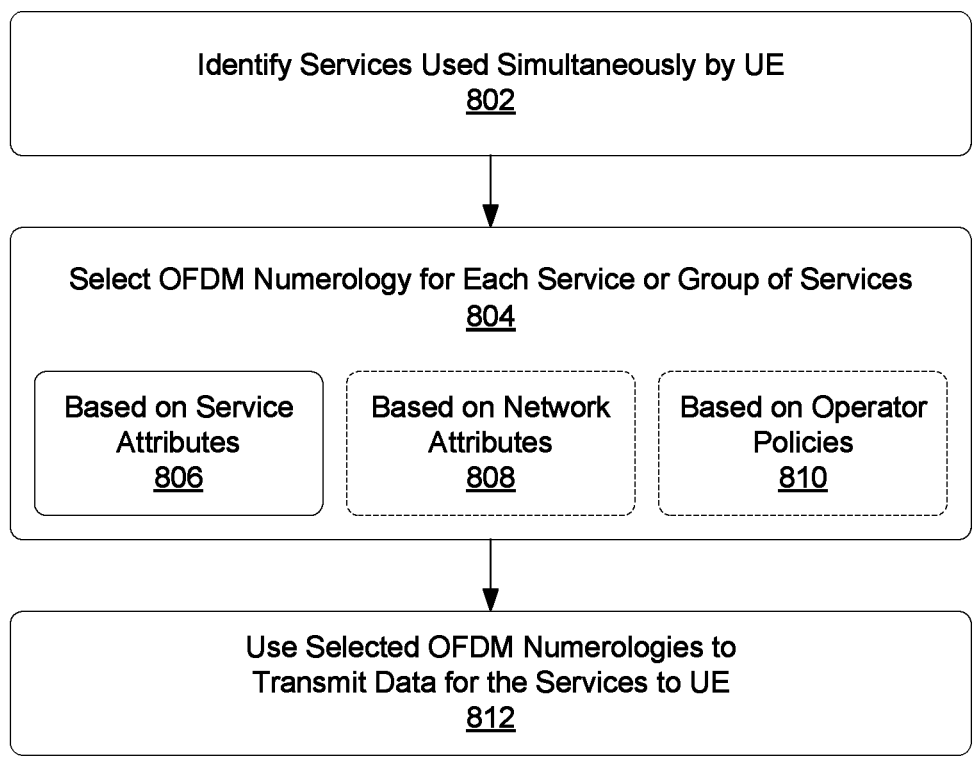
FIG. 8 depicts a flow chart of an exemplary process for assigning OFDM numerologies for multiple services being used by a single UE.

FIG. 8 depicts a flow chart of an exemplary process for assigning OFDM numerologies for multiple services being used by a single UE 102.

At block 802, a base station 104 can determine that a UE 102 is engaged in multiple services by analyzing data for the UE 102 at an SDAP layer 302 and/or other protocol layers above the physical layer 310. For example, the base station 104 can review data packets addressed to the UE 102 at an SDAP layer 302, determine that the data packets are associated with two QoS Flow IDs, and accordingly determine that the UE is engaged in two different services. In some examples, the core network 106 can determine that the UE 102 is engaged in multiple services, and inform the base station 104 along with any attributes of those services determined by the core network 106. In some examples, the base station 104 or core network 106 can group one or more of the multiple services into the same group, such as groups corresponding to eMBB, URLLC, mMTC, or M-IoT categories.

At block 804, the base station 104 can select an OFDM numerology for data associated with individual ones of the multiple services, or a group of services. Selection of an OFDM numerology for a particular service or group of services can be based, at sub-block 806, on service attributes associated with the particular service or group of services. For example, the base station 104 can analyze data packets at a SDAP layer 302 or other protocol layer higher than the physical layer 310 to identify a service, a service category, a QoS Flow ID, and/or associated performance goals or requirements related to latency, reliability, availability, data rate, and/or packet loss, a QCI, QoS parameters, QoE parameters, a priority level, a package length, an SPID, an ARP, and/or other parameters. In some cases, the core network 106 can review traffic associated with the UE 102 to determine one or more service attributes, and inform the base station 104 of those determined service attributes. In some examples, the core network 106 can also indicate when service attributes of multiple services indicate that those multiple services should be grouped together or should be considered separately during the following blocks.

The base station 104 can then determine an OFDM numerology associated with benefits that that can help meet the desired performance goals or requirements. For example, the base station 104 may determine that some data packets for the UE 102 are associated with a first service that has a low latency goal, while other data packets for the UE 102 are associated with a second service that uses a large package length. Accordingly, the base station 104 can select a first OFDM numerology associated with shorter OFDM symbols for the first service, in order to meet the first service's low latency goal, while selecting a second OFDM numerology associated with longer OFDM symbols for the second service that correspond to the second service's larger package length. In other examples, the base station 104 can determine that multiple services in a group share at least some service attributes, or can have been informed by the core network 106 that the multiple services should be grouped, and can select a shared OFDM numerology for all of the services in that group.

In some examples, selection of OFDM numerologies for individual services or groups of services during block 804 can additionally include selecting the OFDM numerologies based on network attributes at sub-block 808 and/or based on operator policies at sub-block 810. For example, if network attributes indicate that a particular 5G NR frequency band is supported by the base station and an operator policy allows 30 kHz, 60 kHz, or 120 kHz subcarrier spacing 404 on that frequency band, the base station 104 can select one of 30 kHz, 60 kHz, or 120 kHz subcarrier spacing 404 for a particular service or group of services, while selecting between allowable subcarrier spacing 404 values on the same or different bands for other services or groups of services.

At block 812, the base station 104 can transmit data for the services to the UE 102 in subcarriers 402 using the selected OFDM numerologies. In some cases, the base station 104 can send a message to the UE 102 indicating which OFDM numerologies have been selected for the services or groups of services, such that the UE 102 can use that selected OFDM numerologies to receive data for the services or groups of services.

As noted above, if the base station 104 determines that the same OFDM numerology should be used for a group of services that the UE is using simultaneously, the base station 104 can use the same OFDM numerology for transmissions associated with all of those services, in the same frequency band or in different frequency bands. For example, the base station 104 can determine that a UE 102 is engaged in multiple eMBB services, and accordingly use the same OFDM numerology to transmit data of those eMBB services. However, in other examples a base station 104 can determine that a UE 102 is engaged in multiple eMBB services, but determine that some have lower latency requirements than others. Accordingly, the base station 104 can use OFDM numerologies that provide lower latency benefits for those services, while using different OFDM numerologies for other services that do not rely on low latency transmissions.

CONCLUSION

As described above, a base station 104 can select an OFDM numerology for transmissions to a UE 102 based at least in part on attributes of one or more services being used by the UE 102. In some cases, the base station 104 can additionally consider network attributes and/or operator policies when selecting OFDM numerologies.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
    performing, by a base station of a telecommunication network, a handover operation associated with a user equipment (UE);
    determining, by the base station, one or more service attributes associated with a service the UE is using via the telecommunication network at a time of the handover operation, based at least in part on analysis of one or more data packets associated with the service that pass through the base station;
    identifying, by the base station, and based on the one or more service attributes associated with the service the UE is using, one or more performance goals associated with the service;
    dynamically selecting, by the base station, a numerology indicating a subcarrier spacing, wherein the numerology corresponds to the one or more performance goals associated with the service; and
    transmitting, by the base station, data associated with the service to the UE in at least one subcarrier spaced apart from adjacent subcarriers by the subcarrier spacing.

2. The method of claim 1, wherein the numerology is an orthogonal frequency-division multiplexing (OFDM) numerology.

3. The method of claim 1, wherein the handover operation is a transition of the UE to the base station from a different base station.

4. The method of claim 1, wherein:
    the handover operation is a transition of the UE from a first network layer supported by the base station to a second network layer supported by the base station, and
    the first network layer is associated with a different frequency band or wireless access technology than the second network layer.

5. The method of claim 1, wherein:
    the handover operation is a transition of the UE from a first frequency band to a second frequency band,
    the first frequency band supports a first numerology set,
    the second frequency band supports a second numerology set, and
    the base station selects the numerology from the second numerology set supported by the second frequency band.

6. The method of claim 5, wherein:
    the first frequency band is a Long Term Evolution (LTE) band,
    the first numerology set, supported by the first frequency band, includes a single numerology,
    the second frequency band is a fifth generation (5G) New Radio (NR) band, and
    the second numerology set, supported by the second frequency band, includes a plurality of numerologies.

7. The method of claim 1, wherein:
    one or more network attributes or operator policies indicate a set of numerologies usable via a connection between the UE and the base station following the handover operation, and
    the base station selects the numerology from the set of numerologies indicated by the one or more network attributes or operator policies.

8. The method of claim 1, wherein:
    the numerology selected by the base station is a first numerology, and
    the first numerology is different from a second numerology that was used to transmit the data associated with the service to the UE prior to the handover operation.

9. The method of claim 1, wherein the base station determines the one or more service attributes by analyzing the one or more data packets associated with the service at a Service Data Adaptation Protocol (SDAP) layer or other layer of a protocol stack.

10. The method of claim 1, wherein the one or more service attributes includes one or more of a Quality of Service (QoS) Flow Identifier, a QoS Class Identifier (QCI), QoS parameters, Quality of Experience (QoE) parameters, a priority level, a package length, a Service Profile Identifier (SPID), or an Allocation and Retention Policy (ARP).

11. The method of claim 1, wherein the one or more performance goals associated with the service are associated with one or more of latency, reliability, availability, data rate, or packet loss.

12. The method of claim 1, wherein the service is a first service, the numerology is a first numerology, and the subcarrier spacing is a first subcarrier spacing, the method further comprising:
    determining, by the base station, one or more second service attributes associated with a second service the UE is using via the telecommunication network at the time of the handover operation;
    identifying, by the base station, and based on the one or more second service attributes, one or more second performance goals associated with the second service;

selecting, by the base station, a second numerology indicating a second subcarrier spacing, wherein the second numerology corresponds to the one or more second performance goals; and transmitting, by the base station, second data associated with the second service to the UE in at least one second subcarrier spaced apart from other adjacent subcarriers by the second subcarrier spacing.

13. A base station of a telecommunication network, comprising:

one or more processors;

transmission components configured to wirelessly connect the base station to a user equipment (UE) using a wireless access technology; and memory storing computer-executable instructions that, when executed by the one or more processors, cause the base station to perform operations comprising:

performing a handover operation associated with the UE;

determining one or more service attributes associated with a service the UE is using via the telecommunication network at a time of the handover operation, based at least in part on analysis of one or more data packets associated with the service that pass through the base station;

identifying, based on the one or more service attributes associated with the service the UE is using, one or more performance goals associated with the service;

dynamically selecting a numerology indicating a subcarrier spacing, wherein the numerology corresponds to the one or more performance goals associated with the service; and transmitting data associated with the service to the UE in at least one subcarrier spaced apart from adjacent subcarriers by the subcarrier spacing.

14. The base station of claim 13, wherein the handover operation is a transition of the UE:

to the base station from a different base station, or between frequency bands supported by the base station.

15. The base station of claim 13, wherein:

the handover operation is a transition of the UE from a first frequency band to a second frequency band, the first frequency band supports a first numerology set, the second frequency band supports a second numerology set, and the computer-executable instructions cause the base station to select the numerology from the second numerology set supported by the second frequency band.

16. The base station of claim 13, wherein:

one or more network attributes or operator policies indicate a set of numerologies usable via a connection between the UE and the base station following the handover operation, and the computer-executable instructions cause the base station to select the numerology from the set of numerologies indicated by the one or more network attributes or operator policies.

17. One or more non-transitory computer-readable media storing computer-executable instructions that, when executed by one or more processors of a base station of a telecommunication network, cause the base station to perform operations comprising:

performing a handover operation associated with a user equipment (UE);

determining one or more service attributes associated with a service the UE is using via the telecommunication network at a time of the handover operation, based at least in part on analysis of one or more data packets associated with the service that pass through the base station;

identifying, based on the one or more service attributes associated with the service the UE is using, one or more performance goals associated with the service;

dynamically selecting a numerology indicating a subcarrier spacing, wherein the numerology corresponds to the one or more performance goals associated with the service; and transmitting data associated with the service to the UE in at least one subcarrier spaced apart from adjacent subcarriers by the subcarrier spacing.

18. The one or more non-transitory computer-readable media of claim 17, wherein:

the handover operation is a transition of the UE from a first frequency band to a second frequency band, the first frequency band supports a first numerology set, the second frequency band supports a second numerology set, and the computer-executable instructions cause the base station to select the numerology from the second numerology set supported by the second frequency band.

19. The one or more non-transitory computer-readable media of claim 17, wherein:

one or more network attributes or operator policies indicate a set of numerologies usable via a connection between the UE and the base station following the handover operation, and the computer-executable instructions cause the base station to select the numerology from the set of numerologies indicated by the one or more network attributes or operator policies.

20. The one or more non-transitory computer-readable media of claim 17, wherein the handover operation is a transition of the UE:

to the base station from a different base station, or between frequency bands supported by the base station.

* * * * *